(12) United States Patent
Doty et al.

(10) Patent No.: US 10,302,450 B1
(45) Date of Patent: May 28, 2019

(54) METHODS AND SYSTEMS FOR HIGH ACCURACY AND INTEGRITY ESTIMATION OF FLIGHT CRITICAL AIRCRAFT STATES

(71) Applicant: Rockwell Collins, Inc., Cedar Rapids, IA (US)

(72) Inventors: James H. Doty, Cedar Rapids, IA (US); Vladislav Gavrilets, McLean, VA (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 0 days.

(21) Appl. No.: 15/627,317

(22) Filed: Jun. 19, 2017

(51) Int. Cl.
*G01C 23/00* (2006.01)
*B64D 43/02* (2006.01)
*B64C 39/02* (2006.01)

(52) U.S. Cl.
CPC ............ *G01C 23/00* (2013.01); *B64C 39/024* (2013.01)

(58) Field of Classification Search
None
See application file for complete search history.

(56) References Cited

U.S. PATENT DOCUMENTS

| | | | |
|---|---|---|---|
| 9,524,648 B1* | 12/2016 | Gopalakrishnan | B64C 39/00 |
| 9,581,692 B2* | 2/2017 | Lamkin | G08G 5/0021 |
| 2009/0306829 A1* | 12/2009 | Hildebrand | B64C 11/008 700/279 |
| 2012/0209455 A1* | 8/2012 | Warkomski | G05D 1/0808 701/3 |
| 2013/0151195 A1* | 6/2013 | Marinoni | G01B 7/30 702/151 |
| 2017/0358219 A1* | 12/2017 | Garai | B64D 43/02 |

* cited by examiner

*Primary Examiner* — John F Mortell
(74) *Attorney, Agent, or Firm* — Donna P. Suchy; Daniel M. Barbieri

(57) ABSTRACT

A system includes a first solution engine, second solution engine, output voter engine, and output modification engine. The first solution engine receives first sensor data associated with a first error rate, and determines at least one first flight parameter based on the first sensor data. The second solution engine receives the first sensor data and second sensor data associated with a second error rate, and determines at least one second flight parameter based on the first and second sensor data. The output voter engine determines a difference between the flight parameters, compares the difference to a first threshold, and generates an output including the at least one first flight parameter or the at least one second flight parameter. The output modification engine receives the output from the output voter engine, modifies a rate of change of the output to be less than a second threshold, and transmits the modified output.

19 Claims, 4 Drawing Sheets

METHODS AND SYSTEMS FOR HIGH ACCURACY AND INTEGRITY ESTIMATION OF FLIGHT CRITICAL AIRCRAFT STATES

BACKGROUND

The inventive concepts disclosed herein relate generally to the field of avionics systems. More particularly, embodiments of the inventive concepts disclosed herein relate to systems and methods for avionics sensor smoothing, such as for output strapdown of rotational inertial solutions.

Various flight parameters, such as attitude, are critical to operation of both manned and unmanned aerial vehicles. In existing aerial vehicles, there may be a tradeoff between the use of sensors for providing flight parameters which have sufficient integrity to meet regulatory requirements but may have relatively low accuracy, and sensors which have low integrity but high accuracy. In other words, there may be a performance benefit to using certain high accuracy sensors, but the performance benefit may be accompanied by an increased risk of failure, including catastrophic failure. For example, a catastrophic failure may result from misleading attitude information being displayed to a pilot and copilot on both primary flight displays of an aircraft, due to a common mode fault in a navigation systems signal. As such, sensors with higher performance may also pose an unacceptable risk of failure.

SUMMARY

In one aspect, the inventive concepts disclosed herein are directed to a system. The system includes a first solution engine, a second solution engine, an output voter engine, and an output modification engine. The first solution engine is configured to receive first sensor data from a first sensor. The first sensor data is associated with a first error rate. The first solution engine is configured to determine at least one first flight parameter based on the first sensor data. The second solution engine is configured to receive the first sensor data and to receive second sensor data. The second sensor data is associated with a second error rate. The second solution engine is configured to determine at least one second flight parameter based on the first sensor data and the second sensor data. The output voter engine is configured to determine a difference between the at least one first flight parameter and the at least one second flight parameter, compare the difference to a first threshold, and generate an output including the at least one first flight parameter or the at least one second flight parameter based on the comparison. The output modification engine is configured to receive the output from the output voter engine, determine a rate of change between the output and a previous output, modify the output to reduce the rate of change to be less than a second threshold, and transmit the modified output.

In a further aspect, the inventive concepts disclosed herein are directed to an airborne platform. The airborne platform includes a first sensor, a second sensor, and a processing circuit including a first solution engine, a second solution engine, an output voter engine, and an output modification engine. The first sensor is configured to detect first sensor data associated with a first error rate. The second sensor is configured to detect second sensor data associated with a second error rate. The first solution engine is configured to determine at least one first flight parameter based on the first sensor data. The second solution engine is configured to determine at least one second flight parameter based on the first sensor data and the second sensor data. The output voter engine is configured to determine a difference between the at least one first flight parameter and the at least one second flight parameter, compare the difference to a first threshold, and generate an output including the at least one first flight parameter or the at least one second flight parameter based on the comparison. The output modification engine is configured to receive the output from the output voter engine, determine a rate of change between the output and a previous output, modify the output to reduce the rate of change to be less than a second threshold, and transmit the modified output.

In a further aspect, the inventive concepts disclosed herein are directed a method for estimation of aircraft states. The method includes receiving first sensor data from a first sensor, the first sensor associated with a first error rate. The method includes determining at least one first flight parameter based on the first sensor data. The method includes receiving second sensor data from a second sensor, the second sensor associated with a second error rate. The method includes determining at least one second flight parameter based on the second sensor data. The method includes determining a difference between the at least one first flight parameter and the at least one second flight parameter. The method includes comparing the difference to a first threshold. The method includes generating an output including the at least one first flight parameter or the at least one second flight parameter based on the comparison. The method includes generating an output including the at least one first flight parameter or the at least one second flight parameter based on the comparison. The method includes comparing the output to a previous output. The method includes determining a rate of change between the output and the previous output. The method includes modifying the output to reduce the rate of change to be less than a second threshold. The method includes transmitting the modified output.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
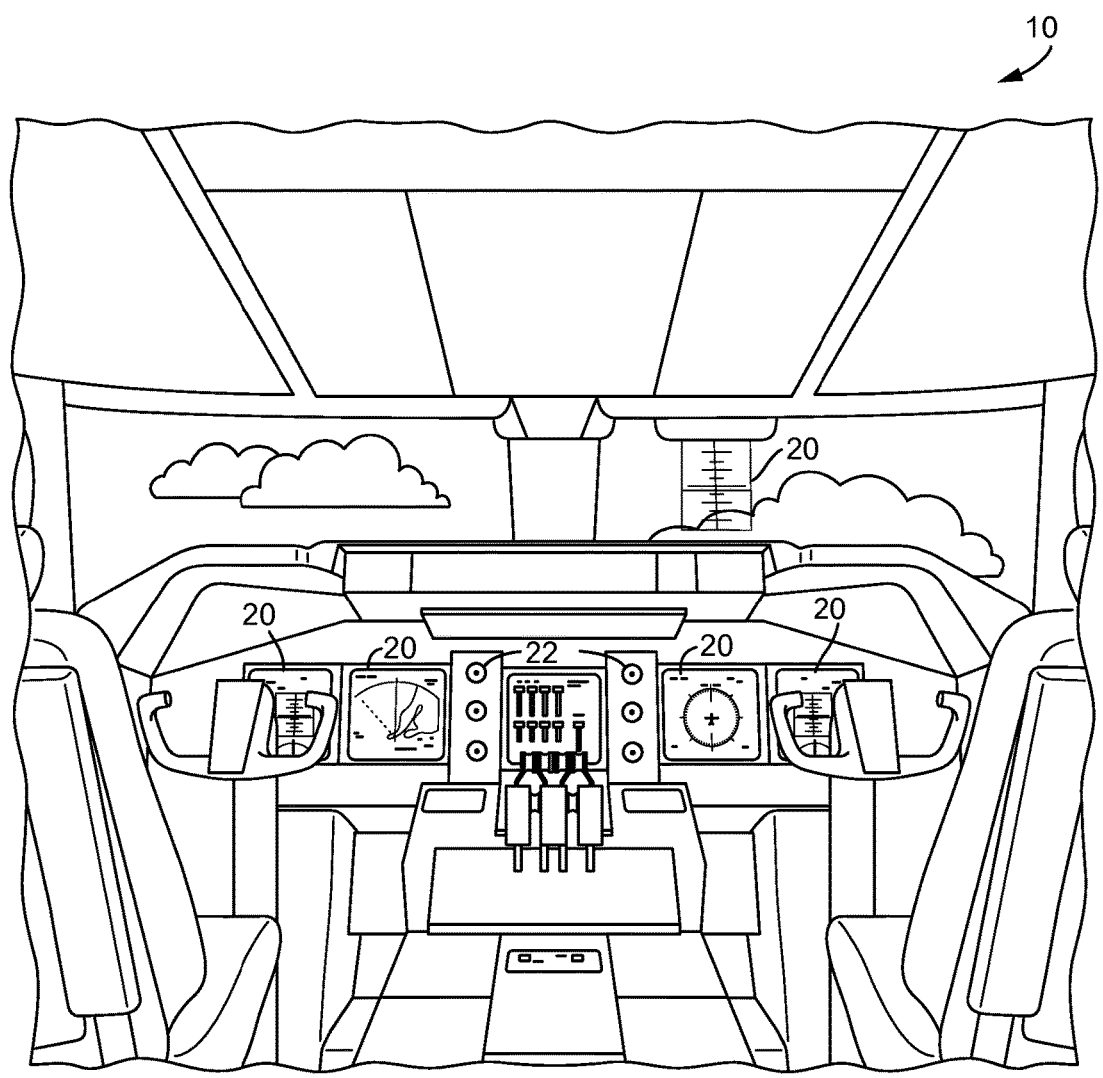
FIG. 1 is a schematic illustration of an exemplary embodiment of an aircraft flight deck according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for avionics sensor smoothing, such as for output strapdown of rotational inertial solutions. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a system includes a first solution engine, a second solution engine, an output voter engine, and an output modification engine. The first solution engine is configured to receive first sensor data from a first sensor. The first sensor data is associated with a first error rate. The first solution engine is configured to determine at least one first flight parameter based on the first sensor data. The second solution engine is configured to receive the first sensor data and to receive second sensor data. The second sensor data is associated with a second error rate. The second solution engine is configured to determine at least one second flight parameter based on the first sensor data and the second sensor data. The output voter engine is configured to determine a difference between the at least one first flight parameter and the at least one second flight parameter, compare the difference to a first threshold, and generate an output including the at least one first flight parameter or the at least one second flight parameter based on the comparison. The output modification engine is configured to receive the output from the output voter engine, determine a rate of change between the output and a previous output, modify the output to reduce the rate of change to be less than a second threshold, and transmit the modified output.

The system can be integrated with an airborne platform or other platform as described herein. For example, the feedback and display devices described herein can be associated with an aircraft cockpit display of the airborne platform.

Systems manufactured in accordance with the inventive concepts disclosed herein can improve the operation of aircraft and other platforms by allowing for improved performance using highly accurate sensors without reducing the integrity of avionics systems which operate on sensor data received from low integrity sensors. Systems manufactured in accordance with the inventive concepts disclosed herein can also enable continuous output of flight parameters even when flight parameters are switched between low integrity and high integrity solutions when the low integrity and high integrity solutions diverge, facilitating both high performance and safe operation of aerial vehicles and other airborne platforms.

Referring to FIG. 1, a perspective view schematic illustration of an aircraft flight deck or cockpit 10 is shown accordingly to an exemplary embodiment of the inventive concepts disclosed herein. The aircraft flight deck 10 can be configured for an aircraft operator or other user to interact with avionics systems of an airborne platform. The aircraft flight deck 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head down displays (HDDs), head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to display images generated based on sensor data or flight parameters modified according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 2:
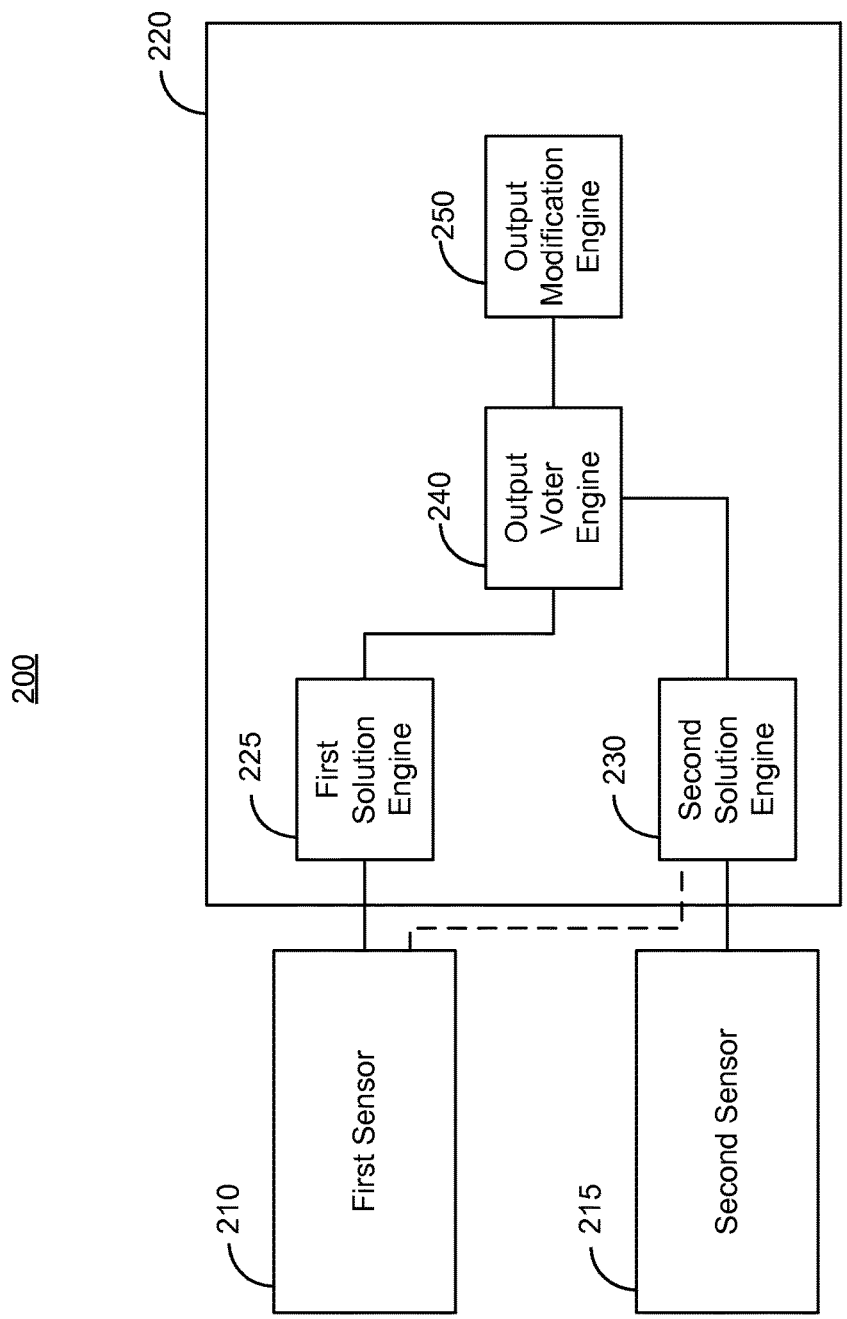
FIG. 2 is a block diagram of an exemplary embodiment of a system for avionics sensor smoothing according to the inventive concepts disclosed herein.

Referring now to FIG. 2, a schematic diagram of a system 200 (e.g., an avionics system) is shown according to an exemplary embodiment of the inventive concepts disclosed herein. The system 200 includes at least one first sensor 210, at least one second sensor 215, and a processing circuit 220. The system 200 may be configured to execute strap-down attitude and heading reference operations. The system 200 may be configured to execute output strapdown integration of rotational inertial solutions.

The processing circuit 220 (e.g., control circuit, processing electronics) can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein. For example, as shown in FIG. 2, the processing circuit 220 can include a first solution engine 225, a second solution engine 230, an output voter engine 240, and an output modification engine 250. It will be appreciated that the components of the processing circuit 220 may be distributed across various processing devices, and/or may be implemented on a multi-core processor.

The at least one first sensor 210 is configured to detect, generate, and/or output first sensor data. The at least one first sensor 210 can be configured to sense information regarding an environment about an airborne platform and generate the first sensor data to be an electronic representation of the sensed information. The at least one first sensor 210 may include at least one of an inertial measurement unit (which may include one or more gyroscopes and one or more accelerometers, such as three gyroscopes and three accelerometers), an air data sensor (e.g., sensor(s) configured to detect and output an indication of static pressure), or a magnetic compass.

In some embodiments, the first sensor data is associated with a first error rate. The first error rate may include a first fault rate of the at least one first sensor 210. The first fault rate may be an expected or predetermined rate below which the at least one first sensor 210 may be expected to output faulty or inaccurate data. In some embodiments, the first fault rate corresponds to a regulatory requirement for the at least one first sensor 210. The first fault rate may be $10^{-9}$ faults/hour.

The at least one second sensor 215 is configured to detect, generate, receive, and/or output second sensor data. The at least one second sensor 215 can be configured to sense information regarding an environment about an airborne platform and generate the second sensor data to be an electronic representation of the sensed information. The at least one second sensor 215 may include at least one of a navigation system, a vision system (e.g., a camera, an infrared image sensor, a LIDAR), a global navigation satellite system (GNSS), or a weather radar system (e.g., a weather radar configured to output Doppler measurements).

The second sensor data is associated with a second error rate, which may be different than the first error rate. Like the first error rate, the second error rate may include a second fault rate of the at least one second sensor 215. The second error rate (e.g., including the second fault rate) may be greater than the first error rate. The second error rate may be greater than a threshold maximum error rate corresponding to regulatory requirements. The second fault rate may be on the orders of $10^{-6}$ to $10^{-3}$ faults/hour. The second error rate or second fault rate may also be unknown, indeterminate, or unable to be measured, such that the second sensor data cannot be trusted.

In some embodiments, the at least one first sensor 210 includes a GPS sensor, which may be a pure inertial GPS sensor, or a receiver autonomous integrity monitoring GPS sensor, and the at least one second sensor 215 includes a GNSS sensor or a vision system. This may allow the GPS sensor to provide a trusted solution for position and velocity, while combining the sensor data from the GPS sensor of the at least one first sensor 210 with position and velocity sensor data from the GNSS sensor or vision system of the at least one second sensor 215 may enable the use of a multi-frequency and/or multi-constellation solution for improved performance (e.g., more accurate determination of position most of the time).

The second error rate may also be representative of other anomalies associated with operation of the at least one second sensor 215. For example, the at least one second sensor 215 may include a vision system which may function as designed, but mischaracterize detected image data (e.g., detect an optical illusion) and output inaccurate sensor data because of the mischaracterized image data.

In some embodiments, the at least one first sensor 210 is associated with a first accuracy, and the at least one second sensor 215 is associated with a second accuracy. The accuracies may be associated with functions performed by the sensors 210, 215, such as detecting a heading of an airborne platform. The second accuracy may be less than the first accuracy by a threshold accuracy difference. As an illustrate example, the at least one first sensor 210 may include a magnetic compass configured to output a heading value which may be accurate to 3 degrees (e.g., if the sensor 210 outputs a value of 270 degrees, the true heading may be anywhere between 267 degrees and 273 degrees), but the first fault rate may be $10e^{-9}$ faults/hour such that the outputted value is known to be faulty less than $10e^{-9}$ faults/hour; on the other hand, the at least one second sensor 215 may include a GNSS receiver configured to output a heading value which may be accurate to 0.1 degree (e.g., if the sensor 215 outputs a value of 270.0 degrees, the true heading may be anywhere between 269.9 degrees and 270.1 degrees), but the first fault rate may be $10e^{-4}$ faults/hour, such that the outputted value is known to be faulty as frequently as $10e^{-4}$ faults/hour. In various such implementations, the at least one second sensor 215 may provide sensor data which is more accurate, enabling more effective operation of the airborne platform based on the sensor data provided by the at least one second sensor 215, while the at least one first sensor 210 may provide sensor data which is less accurate but more trusted (e.g., trusted enough to meet regulatory requirements).

The first solution engine 225 is configured to determine flight parameters. The first solution engine 225 can determine flight parameters based on sensor data. In some embodiments, the first solution engine 225 is configured to receive first sensor data from the at least one first sensor 210, and determine at least one first flight parameter based on the first sensor data. The at least one first flight parameter may be a solution outputted by the first solution engine 225. The first solution engine 225 may be an independent solution engine, such as by determining, generating, and/or outputting solution information based on trusted sensor data.

In some embodiments, the first solution engine 225 determines the at least one first flight parameter independent of or without using sensor data from the at least one second sensor 215. For example, the first solution engine 225 can determine the at least one first flight parameter based on a set of input data that includes first sensor data received from the at least one first sensor 210 but does not include second sensor data received from the at least one second sensor 215). As such, the output of the first solution engine 225 may be trusted or may otherwise meet regulatory requirements, as the first solution engine 225 uses only trusted sensor data to generate the first flight parameters.

In some embodiments, a flight parameter includes at least one of a pitch, a roll, a heading, a vertical speed, or an altitude of an airborne platform, such as an airborne platform including or coupled to the at least one first sensor 210. The flight parameters may include a position and a velocity. The flight parameters may include an acceleration.

The second solution engine 230 is configured to determine flight parameters. The second solution engine 230 can determine flight parameters based on sensor data. In some embodiments, the second solution engine is configured to receive first sensor data from the at least one first sensor 210, receive second sensor data from the at least one second sensor 215, and determine at least one second flight parameter based on the first sensor data and the second sensor data. The at least one second flight parameter may be a solution outputted by the second solution engine 230. The second solution engine 230 may be a fully-aided solution engine, such as by determining, generating, and/or outputting solution information based on both trusted sensor data and untrusted sensor data.

In some embodiments, unlike the first solution engine 225, the second solution engine 230 is configured to determine the at least one second flight parameter based on both first sensor data from the at least one first sensor 210 and second sensor data from the at least one second sensor 215. In various such embodiments, the second flight parameter(s) outputted by the second solution engine 230 may typically be more accurate than those outputted by the first solution engine 225, enabling more effective operation of the airborne platform, but may be more prone to errors resulting from more frequent faults of the at least one second sensor 215.

In some embodiments, the second solution engine 230 is configured to receive first sensor data from the first sensor 210, as indicated by the dashed line from the first sensor 210 to the second solution engine 230. For example, the first sensor 210 may include an inertial measurement unit, and the second sensor 215 may include a GPS receiver, such that the second solution engine 230 uses sensor data from the inertial measurement unit to generate a GPS-aided estimate of flight parameters. In some embodiments, the second sensor 215 may include both a GPS receiver and a inertial measurement unit, such that the second solution engine 230 need not receive sensor data from the first sensor 210.

The output voter engine 240 can be configured to select one of the at least one first flight parameter or the at least one second flight parameter, such as for modification by the output modification engine 250, or for outputting by the processing circuit 220 to other components of an avionics system or airborne platform. The output voter engine 240 can select the at least one first flight parameter or the at least one second flight parameter based on a policy, algorithm, or heuristic, such as a policy configured to limit faulty sensor data or parameters calculated based on faulty sensor data from being outputted by the processing circuit 220.

In some embodiments, the output voter engine 240 is configured to determine a difference between the at least one first flight parameter and the at least one second flight parameter. The difference may be calculated based on comparing corresponding parameters of the at least one first flight parameter and the at least one second flight parameter (e.g., comparing a position parameter of the at least one first flight parameter to a position parameter of the at least one second flight parameter). The difference may include a plurality of parameter differences corresponding to differences between associated first flight parameters and second flight parameters (e.g., a first difference between a first first flight parameter and a first second flight parameter, a second difference between a second first flight parameter and a second second flight parameter, . . . an nth difference between an nth first flight parameter and an nth second flight parameter). In some embodiments, the output voter engine 240 executes an element-by-element comparison of at least one of a pitch, a roll, a heading, a vertical speed, or an altitude of the at least one first flight parameter and of corresponding parameters of the at least one second flight parameter. In embodiments where the output voter engine 240 determines a plurality of differences between a plurality of flight parameters, the output voter engine 240 may be configured to select the at least one first flight parameter or the at least one second flight parameter for output (as described below) if any of the determined differences are greater than corresponding thresholds (e.g., thresholds corresponding to the appropriate flight parameter).

The output voter engine 240 can be configured to compare the difference to a first threshold. The first threshold may be a predetermined value. The first threshold may represent a tolerance for other avionics systems, which use the output from the output voter engine 240 to perform further calculations, to handle discontinuities in the output. The first threshold may be calibrated to eliminate sudden transients in attitude and heading output during fault detection or false alarms.

The output voter engine 240 can be configured to generate an output including the at least one first flight parameter or the at least one second flight parameter based on the comparison. For example, the output voter engine 240 can switch the output from being based on an independent solution as generated by the first solution engine 225 to a fully-aided solution as generated by the second solution engine 230, or vice versa. By switching the output to the at least one first parameter (e.g., a trusted solution output) outputted by the first solution engine 225 when the at least one first parameter and at least one second parameter diverge (e.g., the difference is greater than the first threshold), the output voter engine 240 can be configured to ensure that a trusted solution output (e.g., sufficiently error- or fault-free output) is being generated based on sensor data.

The output voter engine 240 can generate the output to include (1) the at least one first flight parameter if the difference is greater than the first threshold, or (2) the at least one second flight parameter if the difference is less than or equal to the first threshold.

In some embodiments, the output voter engine 240 can generate the output based on the difference exceeding the first threshold for a predetermined duration of time. For example, the output voter engine 240 can start a timer responsive to the difference being greater than the first threshold, periodically poll the timer to retrieve a duration for which the difference is greater than the first threshold, and compare the duration to a third threshold. The output voter engine 240 can generate the output to include (1) the at least one first flight parameter if the duration is greater than the third threshold, or (2) the at least one second flight parameter if the duration is less than or equal to the third threshold.

The flight parameters may be associated with a plurality of integrity levels, which may correspond to the error rate and/or accuracy of sensor data. For example, heading parameters (e.g., received from a level B magnetometer, or a two-antenna GNSS) may have a first, lower level of integrity than pitch and roll parameters. The output voter engine 240 can be configured to determine that a difference between at least one first flight parameter for a first integrity level parameter (e.g., heading) and at least one second flight parameter for the first integrity level parameter is greater than a first integrity level parameter threshold, and generate the output for each of the at least one flight parameters to include the at least one first flight parameter (e.g., regardless of whether a difference between roll parameters outputted by the at least one first sensor 210 and the at least one second sensor 215 is greater than a roll parameter threshold, if a difference between heading parameters outputted by the at least one first sensor 210 and the at least one second sensor 215 is greater than a heading parameter threshold, then the output voter engine 240 outputs the at least one first flight parameter from the at least one first sensor 210).

The output modification engine 250 is configured to modify the output generated by the output voter engine 240, such as to smooth the output generated by the output voter engine 240 over time. By smoothing the output, the output modification engine 250 can prevent attitude and heading anomalies and sudden shifts in outputted data that could disrupt flight control and other functions. For example, while the output from the output voter engine 240 may exhibit undesirable sudden transients if the output voter engine 240 switches from the at least one first flight parameter from the first solution engine 225 to the at least one second flight parameter from the second solution engine 230, the output modification engine 250 can smooth the switched output (e.g., smooth the output to eliminate sudden output shifts).

In some embodiments, the output modification engine 250 is configured to generate an output of at least one flight parameter that closely follows the at least one second flight parameter from the second solution engine 230 when the output voter engine 240 consistently detects that the at least one flight parameter from the first solution engine and the at least one flight parameter from the second solution engine agree. The output modification engine 250 can monitor a rate of agreement between the flight parameters and modify the output based on the rate of agreement. The output voter engine 240 can determine whether the at least one first flight parameter agree or do not agree (e.g., the difference is consistently less than or greater than the threshold difference) based on a policy, algorithm, or heuristic, such as a policy configured to limit faulty sensor data or parameters calculated based on faulty sensor data from being outputted by the processing circuit 220. The output modification engine 250 can generate an output of at least one flight parameter that closely follows the at least one second flight parameter when the output voter engine 240 consistently detects that the at least one flight parameter and at least one second flight parameter do not agree. The output voter engine 240 can store and update a historical parameter including a plurality of values indicating whether the difference between the at least one first flight parameter outputted by the first solution engine 225 and the at least one second flight parameter outputted by the second solution engine 230 was less than or equal to the first threshold. For example, for each comparison over time between the at least one first flight parameter and the at least one second flight parameter, the output voter engine 240 can store values (e.g., TRUE or FALSE flags) indicating whether the difference for each comparison was less than or equal to the first threshold; the output voter engine 240 may also store the difference (or a modified difference calculated between the difference and the first threshold), such that the historical parameter may provide a measure of agreement over time between the at least one first flight parameter and the at least one second flight parameter. The historical parameter may be limited to a recent set of values (e.g., previous values corresponding to a recent period of time, such as the previous minute, previous thirty minutes, previous hour). The output voter engine 240 can indicate whether the at least one first flight parameter consistently agrees with the at least one second flight parameter based on confidence threshold. For example, the output voter engine 240 can calculate an average of the plurality of values and compare the average to a confidence threshold (e.g., fifty percent, seventy-five percent, ninety percent, ninety-nine percent), and determine the at least one first flight parameter to consistently agree with the at least one second flight parameter if the average is greater than the confidence threshold. In some embodiments, the output voter engine 240 is configured to calculate the average as a weighted average (e.g., a weighted average weighing more recent comparisons more greatly than less recent comparisons). In some embodiments, the output modification engine 250 is configured to output the at least one flight parameter to closely follow the at least one first flight parameter or at least one second flight parameter, as described above, by applying a bias to the at least one first flight parameter or the at least one second flight parameter. For example, if the flight parameters consistently agree, the output modification engine 250 can modify the output to include a bias such that the modified output is closer to the at least one second flight parameter than if the bias were not applied (or vice versa if the flight parameters do not consistently agree); additionally or alternatively, the output modification engine 250 can modify the first threshold to bias the modified output towards the at least one second flight parameter if the flight parameters consistently agree (or vice versa if the flight parameters do not consistently agree). The output modification engine 250 can be configured to generate the modified output to smoothly transition between these two states (outputting the at least one second parameter when the state of agreement or disagreement between the at least one first flight parameter and the at least one second flight parameter), such as by reducing a rate of change between the two states as described herein.

In some embodiments, the output modification engine 250 is configured to receive the output from the output voter engine 240. The output modification engine 250 can determine a rate of change between the output and a previous output, such as by subtracting the previous output from the output and dividing the result by a time difference between a point in time associated with the output (e.g., a time stamp at which the output was received from or generated by the output voter engine 240) and a point in time associated with the previous output (e.g., a time stamp at which the previous output was received from or generated by the output voter engine 240).

The output modification engine 250 can be configured to modify the output to reduce the rate of change between the output and the previous output, and to transmit the modified output. In some embodiments, the output modification engine 250 is configured to compare the rate of change between the output and the previous output to a second threshold (e.g., a rate of change threshold), and modify the output responsive to the rate of change being greater than the rate of change threshold. The rate of change threshold may correspond to a rate at which other components of an airborne platform (e.g., autopilot, autonomous vehicle flight controller) expect to receive data that is apparently continuous. The rate of change threshold may correspond to a maneuverability of an airborne platform. For example, if the airborne platform is capable of turning at 3 degrees/second, the rate of change threshold may be on the order of 3 degrees/second (e.g., between approximately 3 degrees/second and 10 degrees/second), so as to smooth output that is inconsistent with rate of change parameters (e.g., acceptable transients for such factors as airframe safety and passenger comfort, or the risk or adverse effects of persistent errors in the flight parameters). The rate of change threshold may correspond to a regulatory requirement for transitioning between aided and unaided modes (e.g., DO-334 section 2.1.8) to prevent attitude and heading anomalies and sudden shifts that could disrupt flight control and other functions. The output modification engine 250 can modify the output such that a rate of change of the output is less than or equal to the rate of change threshold.

The output modification engine 250 can transmit the modified output for display by display devices (e.g., by flight displays 20 described with reference to FIG. 1). The output modification engine 250 can transmit the modified output to avionics controllers, display controllers, or other components configured to control operation of an airborne platform using the flight parameters.

In some embodiments, the output modification engine 250 is configured to receive third sensor data from the first sensor 210 (e.g., from an inertial measurement unit), and receive third flight parameter error estimates from the output voter engine 240. For example, the output voter engine 240 can be configured to determine third flight parameter error estimates based on comparing the at least one first flight parameter to the at least one second flight parameter (e.g., the third flight parameter error estimate may be a difference between the at least one first flight parameter and the at least one second flight parameter). The third flight parameter error estimates may represent biases of components of the first sensor 210 (e.g., gyroscope biases), which may increase over time if not corrected. The output modification engine 250 can be configured to modify the third sensor data based on the third flight parameter error estimates and an indication of whether the difference determined by the output voter engine 240 is greater than a threshold difference. If the difference is less than the threshold difference, the output modification engine 250 can be configured to generate a modified output based on adding or integrating the third sensor data and the third flight parameter error estimates. If the difference is greater than the threshold difference, the output modification engine 250 can be configured to generate the modified output based on the at least one first flight parameter.

In some embodiments, the at least one first flight parameter and the at least one second flight parameter each provide an estimate of an important (e.g., prioritized, critical) aircraft parameter, for example aircraft orientation, as well as an estimate of the rate of change of the important aircraft parameter, for example angular rotation rates. If the important aircraft parameter estimates from the first solution engine 225 and the second solution engine 230 do not agree within a safety threshold (e.g., a difference between a first important aircraft parameter generated by the first solution engine 225 and a second important aircraft parameter generated by the second solution engine 230 is greater than a safety threshold), then the output voter engine is configured to output the more trusted estimate of the important aircraft parameter, in this example the at least one first flight parameter including first important aircraft parameter, along with its corresponding important aircraft parameter rate of change estimate. If the important aircraft parameter estimates from the first solution, engine 225 and the second solution engine 230 do agree within the safety threshold, the more accurate but less trusted estimate of the important aircraft parameter (e.g., the second important aircraft parameter of the at least one second flight parameter), along with its corresponding important aircraft parameter rate of change estimate, in this example the second solution engine 230, is output by the output voter engine 240. The output modification engine 250 can be configured to integrate the selected rate of change estimate of the important aircraft parameter from the output voter engine 240. The output modification engine 250 can update an internal estimate of the important aircraft parameter based on the integration of the rate of change. The output modification engine 250 can calculate differences between the updated internal estimate of the important aircraft parameter and the value of the important aircraft parameter output by the output voter engine 240. The output modification engine 250 can adjust the internal estimate of the important aircraft parameter toward the value of the important aircraft parameter output by the output voter engine 240. In some embodiments, the size of the correction is limited to a small single correction limit to ensure that the rate of change in the important aircraft parameter is not greater than an important aircraft parameter rate of change threshold. The output modification engine 250 may output the updated internal estimate to other systems, such as a display 20. In some embodiments, this approach ensures that the output modification engine 250 output will tend to follow the rate of change in the important aircraft parameter output by the output voter engine 240, and that it will smoothly converge to closely follow the value of the important aircraft parameter output by the output voter engine 240 if the output voter engine 240 consistently selects a given solution first solution engine 225 or second solution engine 230. However, if the output voter engine 240 intermittently changes its selection of first solution engine 225 or second solution engine 230, for example due to noise, the output of the output modification engine 250 will tend to remain between the estimates output by the first solution engine 225 and second solution engine 230, and transient changes in the output value of the important aircraft parameter from the output modification engine 250 will be limited to the small single correction limit.

In some embodiments, the output voter engine 240 is configured to execute a rotation matrix differencing algorithm. Executing the rotation matrix differencing algorithm may enable the output voter engine 240 to operate independent of attitude and orientation. For example, the output voter engine 240 can output a direction cosine matrix to the output modification engine 250 for the output modification engine 250 to use to correct attitude and/or heading sensor data.

In some embodiments, the processing circuit 220 is configured to operate in varying modes which may relate to a reliability of the sensors 210, 215. The reliability of the sensors 210, 215 may be affected by remote conditions. For example, at high latitudes, or in areas of high magnetic anomalies, such as where the airborne platform is a helicopter, or on or near buildings or ships, the reliability of a magnetometer sensor may be less than a sufficient level at which sensor data from the magnetometer is reliable or meets regulatory requirements. In such situations, the system 200 may be configured to operate in a different mode, such as to exclude or reduce the emphasis of sensor data received from a magnetometer. However, without sensor data from the magnetometer, heading data (e.g., from a gyroscope) may tend to drift, and thus the at least one first flight parameter determined by the first solution engine 225 may tend to drift, as the sensor data from the magnetometer is not available to effectively correct for heading drift. The magnetometer sensor may be configured to detect a low reliability condition and transmit an indication of low reliability, which the processing circuit 220 (e.g., solution engines 225, 230) can use to determine whether to use sensor data from the magnetometer sensor. The processing circuit 220 may also be configured to determine a reliability of sensor data, such as by comparing received sensor data to expected sensor data, or based on sensor data indicating remote conditions.

In some embodiments, the first sensor data from the at least one first sensor 210 includes heading data received from a gyroscope. The first solution engine 225 may be further configured to receive third sensor data from a magnetometer. In a first mode in which the magnetometer is in a high reliability state, the first solution engine 225 can determine a heading parameter of the at least one first flight parameter further based on the third sensor data from the magnetometer. In a second mode in which the magnetometer is in a low reliability state, the first solution engine 225 can be configured to determine the heading parameter independent of the third sensor data from the magnetometer. The second mode may be a directional gyro mode, such as when a gyroscope is being used to provide heading data.

The output modification engine 250 can be further configured to operate in a third mode corresponding to the second mode (e.g., the output modification engine 250 can also operate in a directional gyro mode, such as when the magnetometer is in a low reliability state). In the third mode, the output modification engine 250 can modify the output further based on the heading parameter determined by first solution engine 225 and heading data of the at least one second parameter received from the second solution engine 230. As such, the output modification engine 250 may be able to smooth or correct for heading drift due to an unexpected fault of a fully-aided solution from the second solution engine 230 does not exceed a drift threshold. In some embodiments, the drift threshold corresponds to a heading drift as a function of time (e.g., 5 degrees drift in 10 minutes). The drift threshold may be associated with a regulatory requirement (e.g., FAA Advisory Circular requirements such as C201 DO334 category H10, and C5f).

As will be appreciated from the above, the system 200 may be implemented on a variety of airborne platforms. In some embodiments, the airborne platform is a manned aerial vehicle. The airborne platform may include various flight displays (e.g., flight displays 20 described with reference to FIG. 1), such as primary flight displays. The flight display may be configured to display an indication or a visual representation of modified output received from the output modification engine 250. In existing systems, a first flight display may be made to provide flight data to a pilot, while a second flight display is made to provide flight data to a co-pilot, such that the pilot and co-pilot may compare the displayed flight data to identify discrepancies; however, a common mode fault (e.g., of a common communication link in a GNSS system) would not result in a discrepancy, possibly leading to catastrophic failure because the discrepancy would not be evident. By implementing the inventive concepts disclosed herein, the common mode fault can be prevented from being hidden within the sensor data, and thus the catastrophic failure may be averted.

In some embodiments, the airborne platform is an unmanned aerial vehicle. The unmanned aerial vehicle may be configured to calculate a maneuver based on the modified output and execute the maneuver. By implementing the inventive concepts disclosed herein, the unmanned aerial vehicle may avoid sensor data-based failure, such as a vision system determining that the unmanned aerial vehicle is oriented in a first manner (e.g., upright) when it is actually oriented in a second manner (e.g., upside-down).

In some embodiments, the at least one second sensor 215 includes a first navigation system associated with a first communication pathway, and a second navigation system associated with a second communication pathway. The first communication pathway and the second communication pathway may include at least one common signal. For example, the first and second navigation systems may be GNSSs which may share a common signal. If the common signal is subject to a fault, then a common mode fault may result in the outputs from the first navigation system and the second navigation system. As noted above, these outputs (e.g., attitude outputs) may be provided on primary flight displays 20. Displaying misleading attitude information on both primary flight displays 20 is a catastrophic failure under FAA Advisory Circular 25-11B. Nevertheless, by processing the outputs of the at least one second sensor 215 using the output voter engine 240 and output modification engine 250 as described herein, the integrity of the system 200 may be maintained despite the common mode fault.

The system 200 may include a plurality of first solution engines 225. The system 200 may additionally or alternatively include more than one second solution engine 230. The system 200 can execute output selection by the output voter engine 240 and/or output modification by the output modification engine 250 on one or more outputs from the plurality of first solution engines 225 or the plurality of second solution engines 230. The plurality of first solution engines 225 may be associated with a corresponding plurality of first aiding levels, which may be representative of at least one an error rate or an accuracy of the plurality of first solution engines 225. The plurality of second solution engines 230 may similarly be associated with a plurality of second aiding levels. The output voter engine 240 can be configured to compare flight parameters outputted by each of the first solution engines 225 to flight parameters outputted by each of the second solution engines 230, and select flight parameters for output to the output modification engine 250 based on the comparison.

Figure 3:
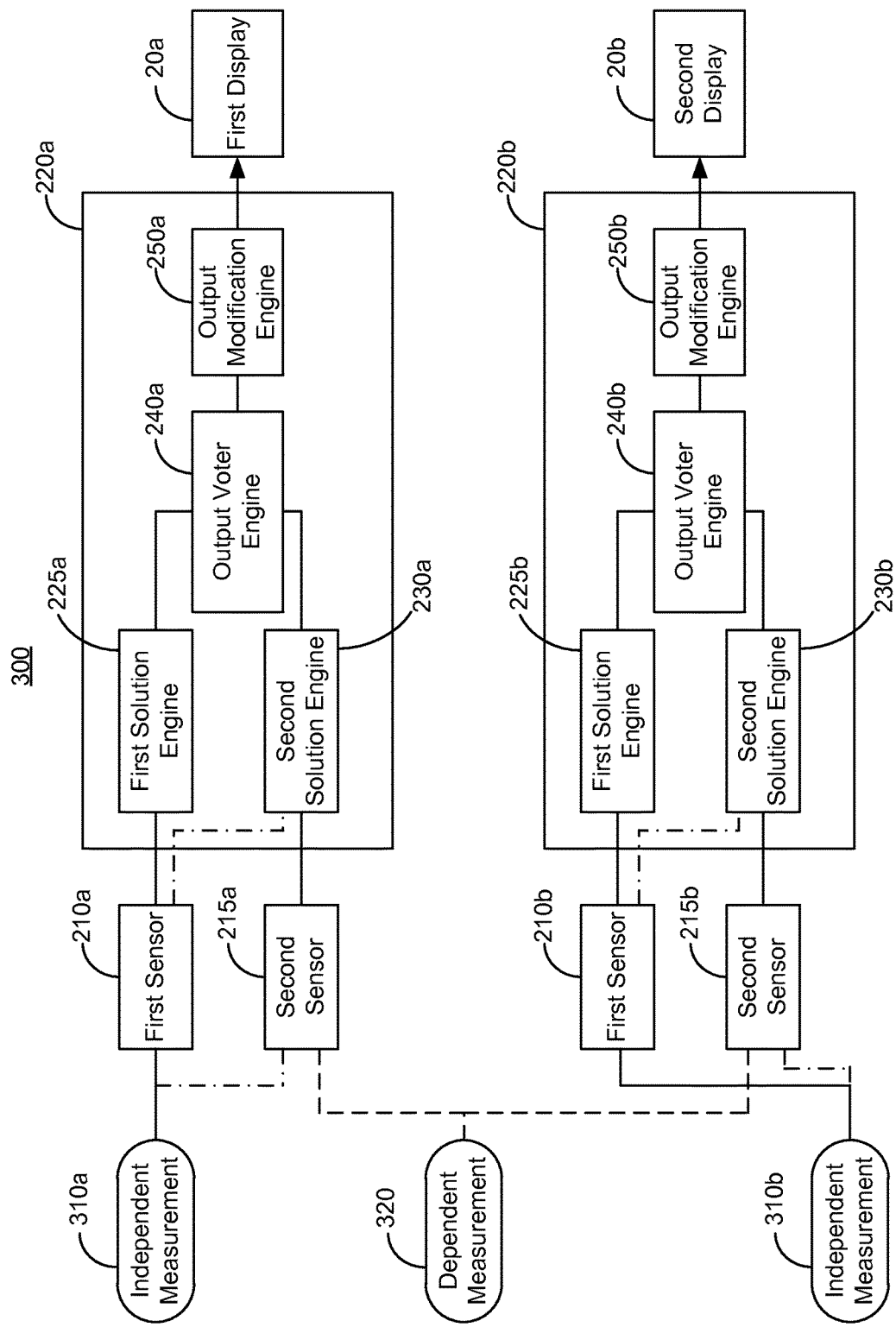
FIG. 3 is a block diagram of an exemplary embodiment of another system for avionics sensor smooth according to the inventive concepts disclosed herein.

Referring now to FIG. 3, a schematic diagram of a system 300 (e.g., an avionics system) is shown according to an exemplary embodiment of the inventive concepts disclosed herein. The system 300 includes at least two instances (e.g., implementations, circuits implementing the system 200 or the components thereof) of the system 200 as described with reference to FIG. 2, with each instance configured to drive a display 20a or a display 20b, respectively (e.g., flight display 20 described with reference to FIG. 1). In some embodiments, the first sensor 210a is configured to output first sensor data based on an independent measurement 310a but not on a dependent measurement 320 (e.g., the first sensor 210a may depend only on independent measurement 310a). Similarly, the first sensor 210b can be configured to output second sensor data based on an independent measurement 310b but not the dependent measurement 320. Therefore, in some such embodiments, the first sensors 210a and 210b are independent of any fault in the dependent measurement 320. In some embodiments, second sensor 210a and second sensor 210b are each configured to output second sensor data based on independent measurements 310a, 310b, respectively, and dependent measurement 320. As such, in some such embodiments, the sensors 210a, 210b have some dependence on the dependent measurement 320, and may have some sensitivity to a fault in dependent measurement 320, which may result in a common mode fault. To prevent the common mode fault in second sensor 215a and second sensor 215b from propagating to display 20a and display 20b (which may cause a catastrophic failure), the output voter engine 240a can be configured to detect when second sensor 215a disagrees with first sensor 210a, not subject to these common mode errors due to a fault in dependent measurement 320, and the output modification engine 250a can be configured to smoothly transition to following (e.g., outputting) an output of the first solution engine 225a. In a similar way, the output voter engine 240b can be configured to detect when the second sensor 215b disagrees with the first sensor 210b, not subject to these common mode errors due to a fault in dependent measurement 320, and the output modification engine 250b can be configured to smoothly transition to following a first solution outputted by first solution engine 225b. In some such embodiments, a fault in dependent measurement 320 can be prevented from propagating to the display 20a and display 20b.

In some embodiments, as indicated by the dot-dashed lines, one or more of the second sensors 215a, 215b may be configured to receive independent measurements 310a, 310b, respectively. For example, the independent measurements 310a, 310b may include angular rate and acceleration. One or more of the first sensors 210a, 210b may include an inertial measurement unit configured to measure angular rate and acceleration. One or more of the second sensors 215a, 215b may also include an inertial measurement unit configured to measure angular rate and acceleration, such that the corresponding second solution engine 230a and 230b may not necessarily be connected to the corresponding first sensor 210a and 210b. However, if one or more of the second sensors 215a, 215b do not include sensors to measure angular rate or acceleration, then the corresponding second solution engine 230a and 230b would be connected to the corresponding first sensor 210a and 210b to provide this data. The dependent measurement 320 may include a pseudorange signal (e.g., from a GPS satellite). As such, the second sensors 215a, 215b may be configured to make pseudorange measurements (e.g., if the second sensors 215*a*, 215*b* include a GPS receiver), which may be provided to one or more of the second solution engines 230*a*, 230*b*, but the first solution engines 225*a* and 225*b* would not use the pseudorange measurements from the second sensors 215*a*, 215*b* because they may contain a common mode fault due to their shared dependence on the dependent measurement 320.

In some embodiments, the independent measurement 310*a* and the independent measurement 310*b* includes or is associated with measurements from two separate on-board avionics sensors, such as inertial systems that are not subject to faults due to any shared system on the aircraft or external to the aircraft.

In some embodiments, the dependent measurement 320 includes or is associated with a radio navigation aid such as a GPS or GNSS receiver, which may receive a common signal in space, and therefore may be subject to common mode faults due to anomalies in the navigation signal in space.

In some embodiments, the dependent measurement 320 includes or is associated with measurements from a vision sensor or from two vision sensors with a similar field of view, and therefore may be subject to common faults (e.g., due to optical illusions).

In some embodiments, the dependent measurement 320 includes or is associated with measurements from a common resource, such as data from a single weather radar system being fed to both second sensor 215*a* and second sensor 215*b*.

Although FIG. 3 illustrates two instances 220*a* and 220*b* of processing circuit 220 for clarity, it will be appreciated that in some embodiments, three or more instances of processing circuit 220 may be used to enhance hardware fault isolation or to allow dispatch of the aircraft with a failed system. Any number of processing circuit 220 may be used with a common dependent measurement 420 and still prevent common mode errors as long as each processing circuit 220 has a separate corresponding independent measurement 310 that is not shared with any other instance of processing circuit 220.

Although FIG. 3 illustrates two instances of display 20*a* and 20*b* as example systems utilizing data as example systems utilizing data from output from multiple instances of processing circuit (processing circuit 220*a* and processing circuit 220*b* in this example) it should be clear that processing circuit 220 outputs data may be used by many other systems such as flight control, guidance, and autopilot functions, and that processing circuit 220 may be used in applications, such as unpiloted vehicles, that may not include displays, or in which the output of multiple instances of processing circuit 220 are combined or voted prior to display.

Figure 4:
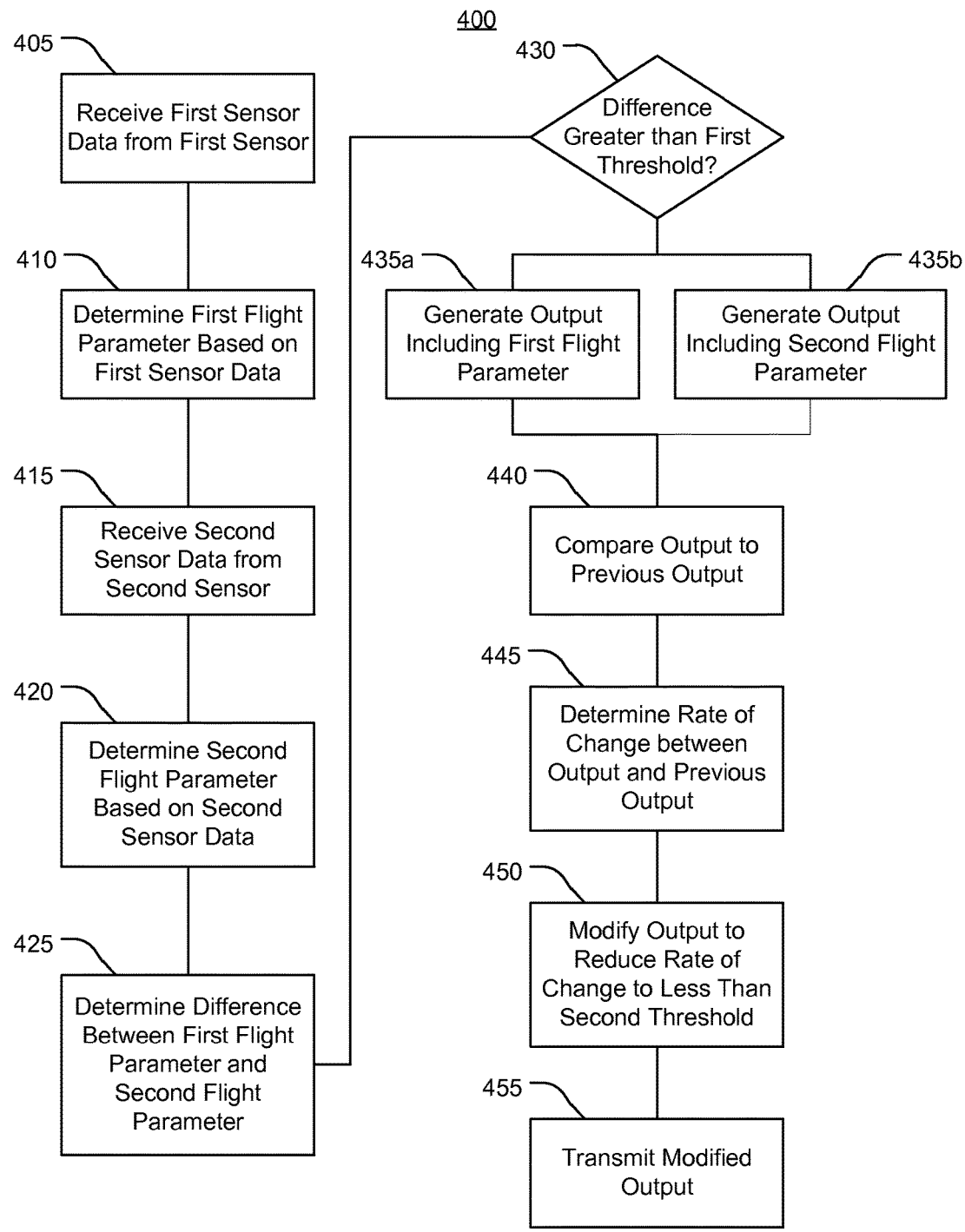
FIG. 4 is a diagram of an exemplary embodiment of a method for avionics sensor smoothing according to the inventive concepts disclosed herein.

Referring now to FIG. 4, an exemplary embodiment of a method 400 according to the inventive concepts disclosed herein may include the following steps. The method 400 may be performed using various hardware, apparatuses, and systems disclosed herein, such as the aircraft flight deck 10, the system 200, the system 300, and/or components thereof.

A step (405) may include receiving first sensor data from a first sensor. The first sensor and/or the first sensor data may be associated with a first error rate. The first error rate may be representative of a fault rate of the first sensor. The first sensor may include at least one of an inertial measurement unit, an air data sensor, or a magnetic compass.

A step (410) may include determining at least one first flight parameter based on the first sensor data. The at least one first flight parameter may include at least one of a least one of a pitch, a roll, a heading, a vertical speed, or an altitude of an airborne platform.

A step (415) may include receiving second sensor data from a second sensor. The second sensor and/or the second sensor data may be associated with a second error rate. The second error rate may include a second fault rate of the second sensor as well as other error rates. The second sensor may include at least one of a navigation system, a vision system (e.g., a camera, an infrared image sensor, a LIDAR), a global navigation satellite system (GNSS), or a weather radar system (e.g., a weather radar configured to output Doppler measurements).

A step (420) may include determining at least one second flight parameter based on the second sensor data. The at least one second flight parameter may include at least one of a least one of a pitch, a roll, a heading, a vertical speed, or an altitude of an airborne platform.

A step (425) may include determining a difference between the at least one first flight parameter and the at least one second flight parameter. The difference may be determined based on subtracting each first flight parameter from each corresponding second flight parameter to determine a plurality of difference values.

A step (430) may include comparing the difference to a first threshold. The first threshold may be a predetermined value. The first threshold may represent a tolerance for other avionics systems to handle discontinuities in the output. The first threshold may be calibrated to eliminate sudden transients in attitude and heading output during fault detection or false alarms. Comparing the difference may include comparing a plurality of difference values to corresponding thresholds for the associated flight parameters.

A step (435*a*) may include generating an output including the at least one first flight parameter if the difference is greater than the first threshold. A step (335*b*) may include generating the output including the at least one second flight parameter if the difference is less than or equal to the first threshold. In some embodiments, the output is generated based on the difference exceeding the first threshold for a predetermined duration of time.

A step (440) may include comparing the output to a previous output. A step (345) may include determining a rate of change between the output and the previous output. For example, the previous output may be subtracted from the output, and the result divided by a time difference between the output and the previous output to determine the rate of change.

A step (450) may include modifying the output to reduce the rate of change to be less than a second threshold. The rate of change may be compared to a second threshold (e.g., a rate of change threshold). The output may be modified responsive to the rate of change being greater than the rate of change threshold. For example, the output may be modified such that a modified rate of change between the modified output and the previous output is less than or equal to the rate of change threshold.

A step (460) may include transmitting the modified output. The modified output may be transmitted to avionics controllers, autopilots, autothrottles, or other components configured to control operation of an airborne platform based on the modified output. The modified output may be transmitted for display by display devices, such as primary flight displays.

As will be appreciated from the above, systems and methods for avionics sensor smoothing according to embodiments of the inventive concepts disclosed herein may improve operation of aircraft and other platforms by allowing for the use of high performance, high accuracy sensors without risking aircraft operation failure due to integrity losses or discontinuous flight parameter outputs.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a processing circuit comprising one or more processors and a non-transitory computer-readable medium comprising machine-readable instructions that when executed by the one or more processors, cause the one or more processors to:
execute a first solution engine to receive first sensor data from a first sensor, the first sensor data associated with a first error rate, the first solution engine to determine at least one first flight parameter based on the first sensor data;
execute a second solution engine to receive the first sensor data and to receive second sensor data, the second sensor data associated with a second error rate greater than the first error rate, the second solution engine to determine at least one second flight parameter based on the first sensor data and the second sensor data;
execute an output voter engine to determine a difference between the at least one first flight parameter and the at least one second flight parameter, compare the difference to a first threshold, and generate an output based on the comparison, the output including (1) the at least one first flight parameter if the difference is greater than the first threshold, or (2) the at least one second flight parameter if the difference is less than the first threshold; and
execute an output modification engine to receive the output from the output voter engine, determine a rate of change between the output and a previous output, modify the output to reduce the rate of change to be less than a second threshold, and transmit the modified output.

2. The system of claim 1, wherein the at least one first flight parameter includes at least one of a pitch, a roll, a heading, a vertical speed, or an altitude of an airborne platform.

3. The system of claim 1, wherein the first error rate is less than a regulatory requirement for the at least one first flight parameter, and the second error rate is at least three orders of magnitude greater than the first error rate.

4. The system of claim 3, wherein the first sensor is associated with a first accuracy for determining a heading of an airborne platform, and the second sensor is associated with a second accuracy less than the first accuracy by a third threshold.

5. The system of claim 1, wherein the instructions cause the one or more processors to execute the output voter engine to execute a rotation matrix differencing algorithm to enable the output voter engine to operate independent of attitude and orientation.

6. The system of claim 1, wherein:
the first sensor data includes heading data received from a gyroscope; and
the instructions cause the one or more processors to:
execute the first solution engine to receive third sensor data from a magnetometer and, in a first mode in which the magnetometer is in a high reliability state, determine a heading parameter of the at least one first flight parameter further based on the third sensor data; and
in a second mode in which the magnetometer is in a low reliability state,
determine the heading parameter independent of the third sensor data; and
execute the output modification engine to operate in a third mode corresponding to the second mode, in which the output modification engine modifies the output further based on the heading parameter and heading data of the at least one second parameter received from the second solution engine.

7. The system of claim 1, wherein the instructions cause the one or more processors to:
execute a third solution engine to receive third sensor data associated with a third error rate, the third solution engine to determine at least one third flight parameter based on the third sensor data and the first sensor data;
execute the output voter engine to determine a difference between the at least one first flight parameter and the at least one third flight parameter, compare the difference to a third threshold, and generate a second output including the at least one first flight parameter or the at least one third flight parameter based on the comparison; and
execute the output modification engine to receive the second output from the output voter engine, compare the second output to a previous second output or to the previous output, determine a second rate of change based on the comparison, modify the second output to reduce the second rate of change to be less than a fourth threshold, and transmit the modified second output.

8. The system of claim 1, wherein the flight parameters include a position and a velocity, the first sensor is a GPS, and the second sensor is at least one of a navigation system or a vision system.

9. The system of claim 1, wherein the instructions cause the one or more processors to execute the output voter engine to:
start a timer responsive to the difference being greater than the first threshold;
periodically poll the timer to retrieve a duration for which the difference is greater than the first threshold;
compare the duration to a third threshold; and
generate the output to include (1) the at least one first flight parameter if the duration is greater than the third threshold, or (2) the at least one second flight parameter if the duration is less than the third threshold.

10. An airborne platform, comprising:
a first sensor to detect first sensor data, the first sensor data associated with a first error rate;
a second sensor to detect second sensor data, the second sensor data associated with a second error rate greater than the first error rate; and
a processing circuit comprising one or more processors and a non-transitory computer-readable medium that when executed by the one or more processors, causes the one or more processors to:
execute a first solution engine to determine at least one first flight parameter based on the first sensor data;
execute a second solution engine to determine at least one second flight parameter based on the first sensor data and the second sensor data;
execute an output voter engine to determine a difference between the at least one first flight parameter and the at least one second flight parameter, compare the difference to a first threshold, and generate an output based on the comparison, the output including (1) the at least one first flight parameter if the difference is greater than the first threshold, or (2) the at least one second flight parameter if the difference is less than the first threshold; and
execute an output modification engine to receive the output from the output voter engine, determine a rate of change between the output and a previous output, modify the output to reduce the rate of change to be less than a second threshold, and transmit the modified output.

11. The airborne platform of claim 10, further comprising a primary flight display to display an indication of the modified output.

12. The airborne platform of claim 10, wherein the first sensor includes at least one of an inertial measurement unit, an air data sensor to output an indication of static pressure, a gyroscope, an accelerometer, or a magnetic compass.

13. The airborne platform of claim 10, wherein the second sensor includes at least one of a navigation system, a GPS system, a weather radar system, or a vision system.

14. The airborne platform of claim 10, wherein the airborne platform is an unmanned aerial vehicle.

15. The airborne platform of claim 10, wherein the second sensor includes a first navigation system associated with a first communication pathway and a second navigation system associated with a second communication pathway, wherein the first communication pathway and the second communication pathway include at least one common signal.

16. A method, comprising:
receiving first sensor data from a first sensor, the first sensor associated with a first error rate;
determining at least one first flight parameter based on the first sensor data;
receiving second sensor data from a second sensor, the second sensor associated with a second error rate greater than the first error rate;
determining at least one second flight parameter based on the second sensor data;
determining a difference between the at least one first flight parameter and the at least one second flight parameter;
comparing the difference to a first threshold;
generating an output based on the comparison, the output including (1) the at least one first flight parameter if the difference is greater than the first threshold or (2) the at least one second flight parameter if the difference is less than the first threshold;
comparing the output to a previous output;
determining a rate of change between the output and the previous output;
modifying the output to reduce the rate of change to be less than a second threshold; and
transmitting the modified output.

17. The method of claim 16, furthering comprising monitoring a rate of agreement between the at least one first flight parameter and the at least one second flight parameter based on the difference, and modifying the output further based on the rate of agreement.

18. The method of claim 16, wherein the first error rate is less than a regulatory requirement for the at least one first flight parameter, and the second error rate is at least three orders of magnitude greater than the first error rate.

19. The airborne platform of claim 10, wherein the first sensor has a first accuracy less than a second accuracy of the second sensor.

* * * * *